June 9, 1936.  J. H. WOODBERRY  2,043,277
PRESSURE INDICATOR
Filed Aug. 16, 1933   3 Sheets-Sheet 1
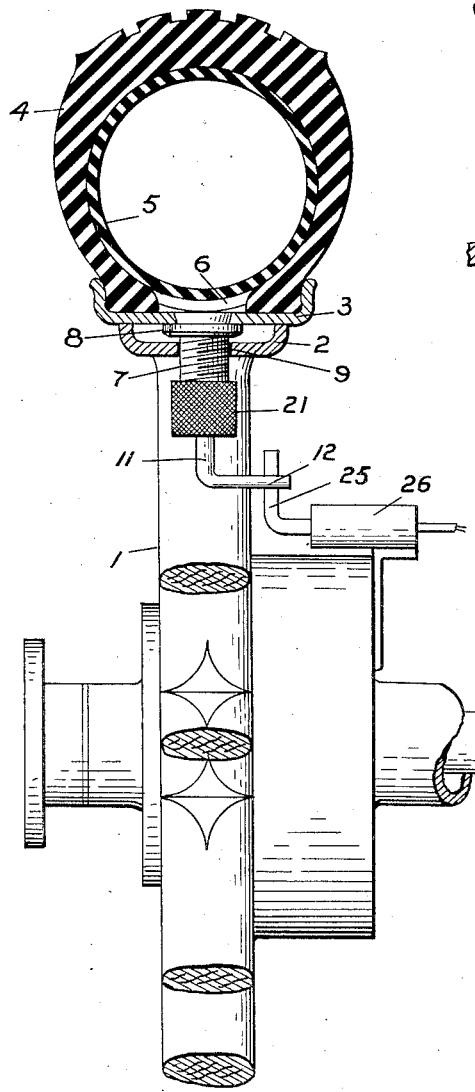
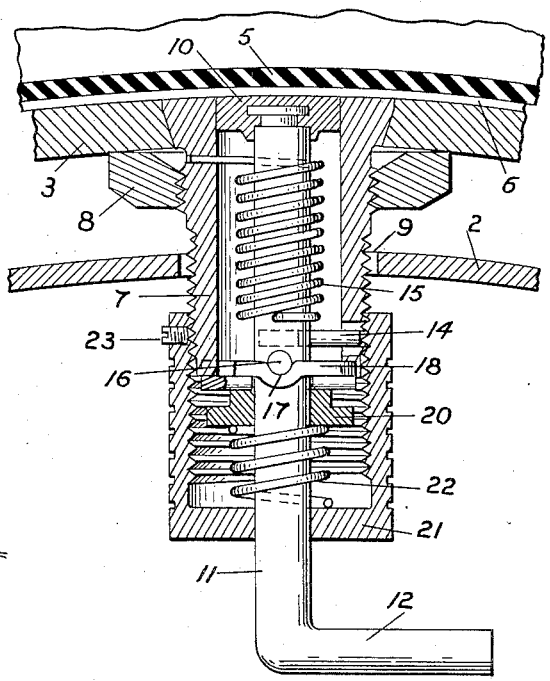
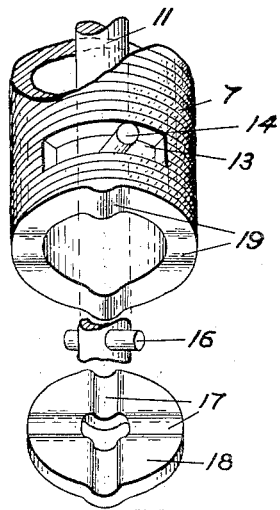
INVENTOR.
John H. Woodberry
BY W. N. Roach
ATTORNEY June 9, 1936.   J. H. WOODBERRY   2,043,277
PRESSURE INDICATOR
Filed Aug. 16, 1933   3 Sheets-Sheet 2
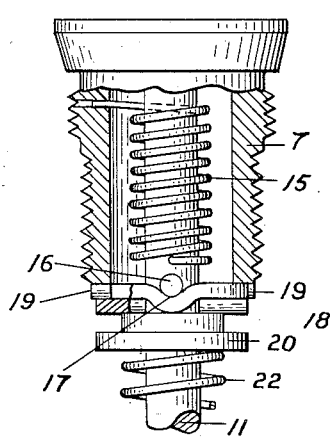
Fig.-4-
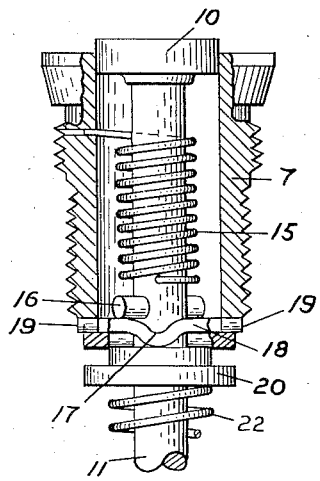
Fig.-5-
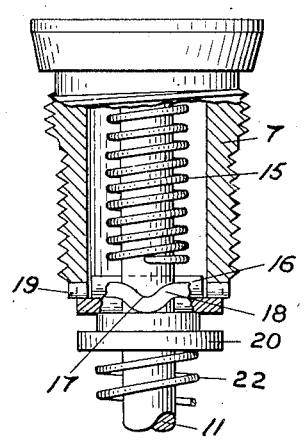
Fig.-6-
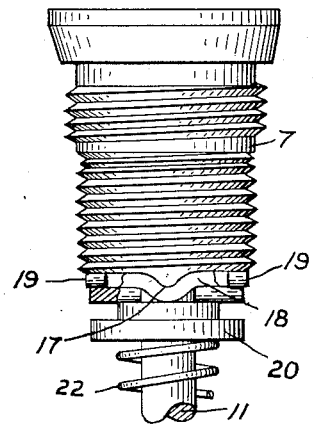
Fig.-7-
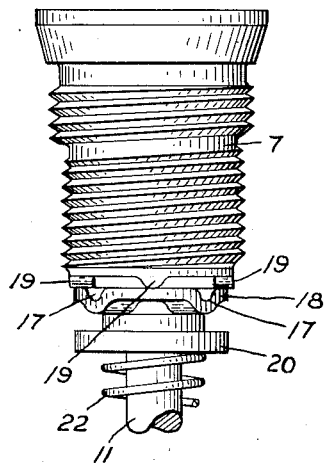
Fig.-8-
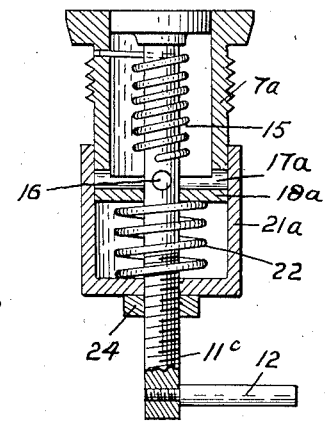
Fig.-9-
Inventor
John H. Woodberry
By N. N. Roach
Attorney

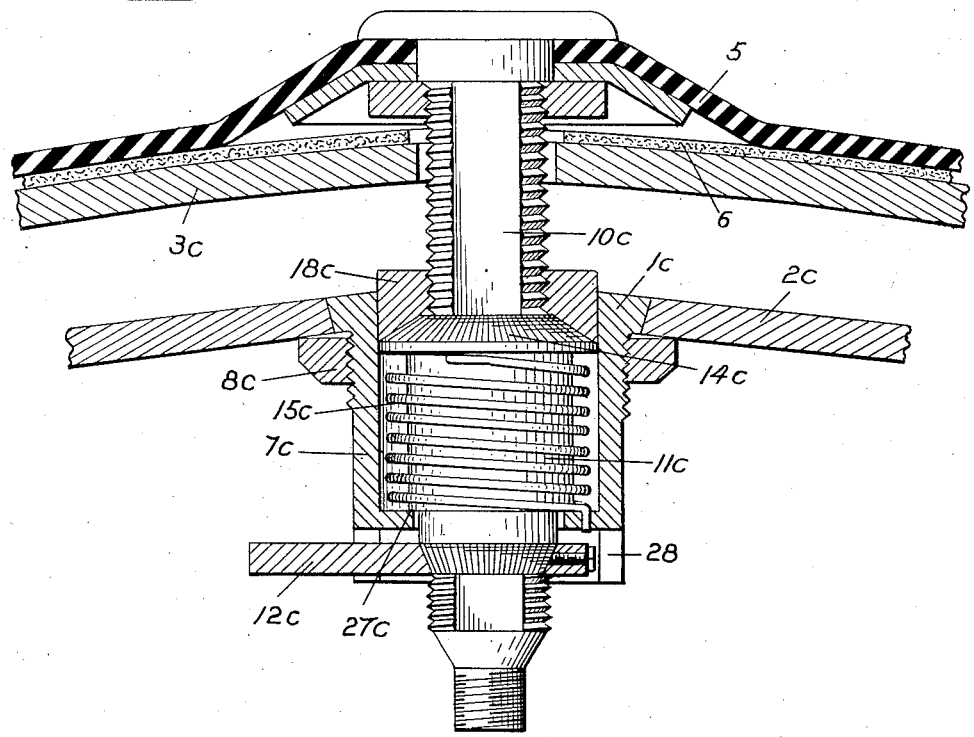
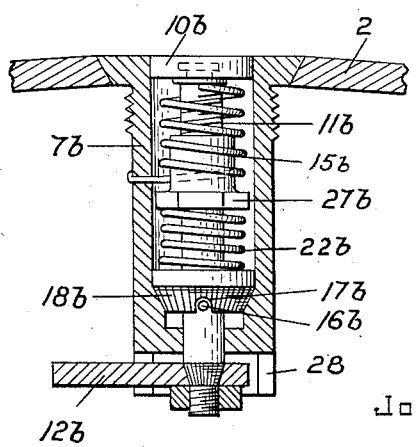

Patented June 9, 1936

2,043,277

UNITED STATES PATENT OFFICE 2,043,277

PRESSURE INDICATOR

John H. Woodberry, United States Army, Fort Bliss, Tex.

Application August 16, 1933, Serial No. 685,473

9 Claims. (Cl. 116—34)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a pressure indicator intended primarily for use with pneumatic tires.

The principal damages to pneumatic tires on vehicles occur through operating at pressures above or below those for which the tires are designed. Low pressure may be due to inattentiveness or to punctures, leaks, etc. High pressures may arise through error in filling or through road heat resulting frequently in blowouts or serious accidents. In most instances these occurrences would be avoided if the operator's attention were attracted to the tires when improper air pressure conditions arise. In the invention described herein there have been devised means for warning the operators of vehicles when injurious or dangerous conditions exist.

To the foregoing ends means have been provided, normally inoperative, but operating upon either high pressure or low pressure to indicate an abnormal condition of pressure. Such means consists essentially of a switch or contact, operating automatically to indicate through mechanical or electrical means the abnormal conditions of pressure.

Practical embodiments of the invention are illustrated in the accompanying drawings, wherein:

Fig. 1 is a fragmentary view of a wheel with the pressure indicator operating means shown in elevation in place thereon and in operative position.

Fig. 2 is an enlarged longitudinal sectional view of the indicator.

Fig. 3 is a detail perspective view, parts broken away showing the parts partially disassembled.

Figs. 4, 5 and 6 are fragmentary sectional views showing positions assumed during operation under low pressure.

Figs. 7 and 8 are fragmentary views showing positions assumed during operation under high pressure.

Fig. 9 is a longitudinal sectional view of a modified form designed to indicate low pressure only.

Fig. 10 is a longitudinal sectional view of another modification of the low pressure indicator, and Fig. 11 is a similar view of another form of high and low pressure indicator.

Referring to the drawings by numerals of reference:

A wheel is indicated at 1 provided with a rim 2 upon which is seated a tire rim 3, for holding a tire consisting of a casing 4 and a tube 5. As a protection to the tube there is usually supplied a flap 6 between the tube and the tire rim.

A housing 7 preferably tubular and exteriorly threaded, is headed into the tire rim 3, with its inner end flush with the outer surface of the rim, and may be clamped in place by a nut 8 threaded on to the housing. When the tire rim is in place on the wheel rim the housing projects through an aperture 9 formed in the wheel rim.

Slidable within the housing 7 is a pressure head 10 rotatably mounted on the inner end of a shaft 11, the outer protruding end of which is provided with an angularly disposed arm 12 which acts as a contact member to close an electrical circuit or operate a mechanical indicating means. In the wall of the housing 7 is formed a slot 13 into which projects the end of a pin 14 suitably secured to the shaft 11 and extending radially therefrom. The slot 13 is of greater depth than the diameter of the pin to allow slight movement of the shaft longitudinally of the housing and the ends of the slot form stops to limit axial rotation of the shaft.

Surrounding that portion of the shaft within the housing 7 is a torsion spring 15, one end of which is anchored in the housing and the other end anchored to the shaft 11 which spring tends to rotate the shaft about its axis but is restrained therefrom by the elements immediately to be described.

A pin 16 is carried by the shaft 11 which normally rests in one of a pair of grooves 17—17 stamped in a washer 18 and extending diametrically thereof. The washer 18 is slidable on the shaft 11 and normally rests on the outer end of the housing with the ends of the grooves 17 in position to receive the tongues 19 provided on the end of said housing. Slidable on the shaft 11 and resting on the washer 18 is a washer 20 and confined between this washer and a screw cap 21 which is threaded on the housing 7 is a compression spring 22 which surrounds the shaft and which may be compressed by adjustment of the screw cap 21 to predetermine the force necessary to permit escape of the pin 16 from the groove 17 under the tension of the torsion spring 15 when pressure is low or to permit washer 18 to ride over the tongues 19 under the tension of the torsion spring 15 when the pressure is high. The screw cap 21 may be held in adjusted position by suitable means herein shown as a set screw 23.

Figure 11 is a variation of Figure 2. In this figure a housing 7b is attached to the tire rim in the manner shown in Figure 2. The pressure head 10b and shaft 11b operate with respect to the housing 7b and with each other similar to corresponding parts in Figure 2. Rotation of the shaft however is limited by shoulders 28 presented by a substantially semi-cylindrical projection at the end of the housing 7b instead of a slot as at 13, Figure 3. One end of the shaft is serrated and threaded to permit adjustments of the arm 12b. From the foregoing it will be understood that the arm 12b performs both the functions of the arm 12 in the preferred form and of the pin 14, acting as a contact member and also as a stop to limit axial rotation of the shaft by engaging the shoulders 28.

The torsion spring 15b is anchored and operated similar to spring 15 in Figure 2, and tends to rotate the shaft 11b about its axis.

In this variation a serrated clutch plate 18b which engages a serrated clutch surface in the head of the housing is employed to restrain rotation of the shaft in lieu of the grooved plate washer 18. This clutch plate 18b is slidably and rotatably mounted on the shaft 11b. A cross pin 16b passing through the shaft, resting in a groove 17b' in the clutch plate prevents rotation of the shaft with respect to the clutch plate, until the tire pressure exceeds a desirable limit, when, acting counter to the compressed spring 22b, the pin 16b is raised out of the groove 17b allowing the shaft to be rotated by the torsion spring 15b.

The clutch plate 18b which is locked to the shaft by means of cross pin 16b, also prevents rotation of the shaft until the tire pressure drops below safe limits, at which time the shaft rotates under the influence of the torsion spring 15b.

Means for adjusting the compression spring to correspond to a desired upper limit of tire pressure are afforded through a nut 27b which is threaded to the shaft 11b. Adjusting means for the torsion spring 15b are obtained through shifting the position of the arm 12b on the end of the shaft 11b so as to provide desired torsional effect.

The modified form shown in Fig. 9 operates on the same principle as the one just described but is designed for slow moving vehicles where road heat and consequent high pressure is not a factor and indicates low pressure only. In this instance the housing 7a is formed with a head 18a in which the diametrically disposed grooves 17a are formed for the reception of the pin 16. The cap 21a may have a sliding fit on the housing 7a and the adjustment thereof made through a nut 24 engaging the cap and threaded on the shaft 11c.

A further embodiment of this invention in a low pressure indicator is shown in Fig. 10. This adaptation involves the use of the valve stem as a pressure element. It has the advantage of eliminating an extra hole in the wheel and tire rims, and is particularly adaptable for use with wheels which have separate tire rims.

A housing 7c, preferably tubular and exteriorly threaded, passes through and is clamped in the wheel rim 2c by means of a head 1c and a nut 8c. When the tire rim 3c and tire are in place the valve stem 10c protrudes through the housing. The outer end of the housing is formed with shoulders 28 in a manner to limit the movement of the arm 12c of the shaft 11c.

Adjustably positioned on the valve stem is an annular fluted or roughened clutch member 18c.

Within the housing 7c and surrounding the valve stem, slidable and rotatable with respect thereto is a hollow shaft 11c provided on one end with an angularly disposed arm 12c which acts as a contact member to operate a warning signal, and on the other end with a fluted or roughened clutch plate 14c which engages in pressure contact with clutch member 18c threaded on the valve stem. The shaft is restrained from outward axial movement by an annular shoulder 27c which rests against the inner end of the housing 7c.

Surrounding shaft 11c within the housing 7c is a torsion spring 15c, one end being anchored to the shaft 11c, the other end being anchored to the housing 7c, which spring tends to rotate the shaft about the valve stem, but is restrained therefrom by clutch contact between plate 14c and clutch member 18c.

The operation of the device in its preferred form is as follows.

The desired adjustment having been made, when pressure within the tube 5 falls below normal to a critical extent pressure on the head 10 is relieved sufficiently to permit the force exerted by the torsion spring 15 to exceed the force tending to hold the pin 16 in a groove 17 so that the pin will be displaced from the groove and the shaft rotated until the pin 14 arrives at an end of the slot 13. In this rotated position of the shaft the arm 12 is brought against an electrical switch handle 25 of switch 26, which is attached to a non-rotating part of the vehicle, to effect the operation of a horn, bell, buzzer, light or other signal, or the arm 12 may mechanically operate the clapper of a bell on each revolution of the wheel.

When pressure within the tube 5 becomes excessive the head 10 is acted upon to slightly compress the spring 22 when the force exerted by the torsion spring 15 will overcome the force tending to hold the washer 18 seated on the end of the housing 7 with the tongues 19 engaged in the grooves 17 and will force the washer to ride over the tongues and the shaft to rotate with the result heretofore described.

The device, after operation thereof, is restored to normal position with the arm 12 lying in the plane of the wheel by grasping the arm 12 and rotating the shaft back to normal, where it will remain if pressure within the tube 5 has been restored to normal.

In the modified form shown in Fig. 10 the operation is as follows:

Pressure from within the tube forces the valve stem head towards the tire rim with a pressure varying with the air pressure. By suitable adjustment of clutch member 18c, which is attached to the valve stem this pressure may be transferred from the wheel rim to the clutch plate of the plunger 11c. This engagement and pressure are used to prevent rotation of the plunger 11c while the tire pressure is sufficient to prevent injury. If the tire pressure decreases to a critical point however, the clutch releases, permitting the plunger to rotate and operate the alarm means.

In the form shown in Fig. 9, when pressure within the tire drops below normal the force tending to retain the pin 16 in the groove 17a is reduced and when such reduction becomes sufficient the force of the torsion spring is sufficient to cam the pin 16 out of the groove and rotate the member 11c.

The operation of the form shown in Fig. 11 is as follows:—When pressure in the tire becomes excessive, the head 10b is forced further into the housing 7b thereby moving the rod 11b to free the pin 16b from the groove 17b allowing the torsion spring 15b to rotate the rod 11b and with it the arm 12b. When pressure drops below normal the pressure on the head 10b is no longer sufficient to overcome the force of the torsion spring 15b tending to turn the rod 11b and the rod will consequently be turned, the clutch member 18b riding over the cooperating surface on the housing 7b.

I claim:—

1. A tire pressure indicator embodying a housing, a shaft within the housing adapted to be acted on by the tire, means for holding the shaft in normal position during predetermined pressure ranges within the tire, a torsion spring for rotating the shaft when the pressure within the tire falls without such predetermined pressure ranges, and a member carried by the shaft and positioned, when the shaft is thus rotated, to trip an indicating means.

2. A tire pressure indicator embodying a housing having an open end, means for securing the housing in fixed relation to a wheel rim with the open end directed toward a pneumatic tire carried by said rim, a shaft within the housing, a pressure element rotatable relatively to the shaft and carried thereby in position to contact that portion of the tire bridging the open end of the housing, means within the housing for holding the shaft in normal position during predetermined pressure ranges within the tire, and means for rotating the shaft when the pressure within the tire falls without such predetermined pressure ranges.

3. A tire pressure indicator embodying a housing having an open end, means for securing the housing in fixed relation to a wheel rim with the open end directed toward a pneumatic tire carried by said rim, a shaft within the housing, a pressure element rotatable relatively to the shaft and carried thereby in position to contact that portion of the tire bridging the open end of the housing, means within the housing for holding the shaft in normal position during predetermined pressure ranges within the tire, and a resilient element for rotating the shaft when the pressure within the tire falls without such predetermined pressure ranges.

4. A tire pressure indicator embodying a housing having an open end, means for securing the housing in fixed relation to a wheel rim with the open end directed toward a pneumatic tire carried by said rim, a shaft within the housing, a pressure element rotatable relatively to the shaft and carried thereby in position to contact that portion of the tire bridging the open end of the housing, means within the housing for holding the shaft in normal position during predetermined pressure ranges within the tire, means for rotating the shaft when the pressure within the tire falls without such predetermined pressure ranges, and a member carried by the shaft and positioned, when the shaft is rotated, to trip an indicating means.

5. A tire pressure indicator embodying a housing having an open end, means for securing the housing in fixed relation to a wheel rim with the open end directed toward a pneumatic tire carried by said rim, a shaft within the housing, a pressure element rotatable relatively to the shaft and carried thereby in position to contact that portion of the tire bridging the open end of the housing, means within the housing for holding the shaft in normal position during predetermined pressure ranges within the tire, a resilient element for rotating the shaft when pressure within the tire falls without such predetermined pressure ranges, and a member carried by the shaft and positioned, when the shaft is thus rotated, to trip an indicating means.

6. A tire pressure indicator embodying a housing having an open end, means for securing the housing in fixed relation to a wheel rim with the open end directed toward a pneumatic tire carried by said rim, a shaft within the housing adapted to be contacted by that portion of the tire bridging the open end of the housing, a torsion element exerting a force to rotate the shaft, pressure means adjustable to overcome the torsion force during predetermined pressure ranges within the tire, and a member carried by the shaft and positioned when the shaft is rotated by the torsion element to trip an indicating means.

7. A tire pressure indicator embodying a housing having an open end, means for securing the housing in fixed relation to a wheel rim with the open end directed toward a pneumatic tire carried by said rim, a shaft within the housing adapted to be contacted by that portion of the tire bridging the open end of the housing, a torsion element exerting a force to rotate the shaft, and pressure means adjustable to overcome the torsion force during predetermined pressure ranges within the tire.

8. A tire pressure indicator embodying a housing having an open end, means for securing the housing in fixed relation to a wheel rim with the open end directed toward a pneumatic tire carried by said rim, a shaft within the housing adapted to be contacted by that portion of the tire bridging the open end of the housing, a torsion element exerting a force to rotate the shaft, pressure means adjustable to overcome the torsion force during predetermined pressure ranges within the tire, and an element secured to the shaft and cooperating with elements on the housing to limit rotation of the shaft.

9. A tire pressure indicator embodying a housing having an open end, means for securing the housing in fixed relation to a wheel rim with the open end directed toward a pneumatic tire carried by the rim, a shaft within the housing adapted to be contacted by that portion of the tire bridging the open end of the housing, a torsion element exerting force to rotate the shaft, pressure means adjustable to overcome the torsion force during predetermined pressure ranges within the tire, an element secured to the shaft and cooperating with elements on the housing to limit rotation of the shaft, and a member carried by the shaft and positioned when the shaft is rotated by the torsion element to trip an indicating means.

JOHN H. WOODBERRY.